Figure 1:
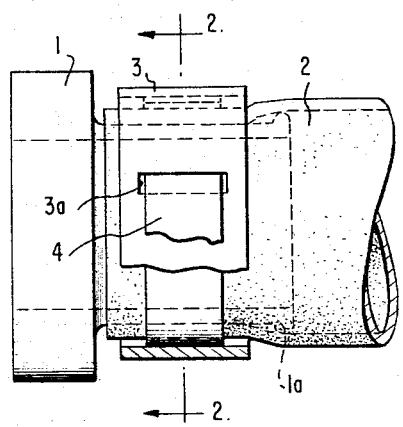

Jan. 10, 1967  H. OETIKER  3,297,343
FASTENING ARRANGEMENT FOR FIRE HOSES AND THE LIKE
Filed March 11, 1965  2 Sheets-Sheet 1

INVENTOR
HANS OETIKER
BY Paul M. Craig, Jr.
ATTORNEY

Jan. 10, 1967  H. OETIKER  3,297,343
FASTENING ARRANGEMENT FOR FIRE HOSES AND THE LIKE
Filed March 11, 1965  2 Sheets-Sheet 2

INVENTOR
HANS OETIKER
BY Paul M. Craig, Jr.
ATTORNEYS

United States Patent Office 3,297,343
Patented Jan. 10, 1967

3,297,343
FASTENING ARRANGEMENT FOR FIRE HOSES
AND THE LIKE
Hans Oetiker, 21 Oberdorfstrasse, Horben, Switzerland
Filed Mar. 11, 1965, Ser. No. 439,053
Claims priority, application Switzerland, Apr. 27, 1962,
4,972/62; Mar. 14, 1964, 3,202/64
2 Claims. (Cl. 285—37)

The present invention is a continuation-in-part application of my copending application Serial No. 275,132, filed April 23, 1963 and now abandoned.

The present invention relates to a fastening arrangement for fire hoses or the like, and more particularly relates to means utilizing a tape or band-like fastening material for tieing large diameter hoses to the connecting nipple of a fire hose coupling. Additionally, the present invention also relates to a tool that facilitates the installation of the fastening arrangement in accordance with the present invention as well as to the method of tieing the hose to the connecting nipple.

It is usual with fire hose couplings to secure or tie the hose slipped over the securing nipple by means of a wire. These prior art wire fastening or tieing arrangements, however, entail considerable disadvantages. In the first place, the installation thereof on the hoses is not simple and requires skilled workers. Furthermore, irrespective of how carefully the fastening is done, there always exists the danger of breaking the wire. Weak places in the wire are not recognizable readily even with the most careful winding. Fastening arrangements by means of hose clamps as are used frequently with rubber hoses, are not utilizable at all because they add far too much in the external dimensions and for that reason no space is available therefor below the connecting nut of the coupling. Endless clamps with ears or lugs produce a very safe fastening and, additionally, the amount of external application as a result thereof is very slight so that such endless clamps would still have space below the connecting nut. However, with such endless clamps the relatively complicated work tool necessary for installing and tightening the clamps is of disadvantage.

These disadvantages are eliminated by the present invention. The present invention thereby starts with the concept of utilizing a thin-walled bushing or sleeve over the hose and to fill the space between the inner wall of the sleeve and the hose surface with simultaneous tight pressing of the hose against the connecting nipple.

The present invention is concerned thereby with a fastening arrangement for fire hoses onto the connecting nipple of a coupling, and essentially consists in that a sleeve is superposed over the hose, itself slipped over the securing nipple, and that this sleeve is provided with a slot through which a winding tape or band is adapted to be inserted between the sleeve and the hose whereby the insertion of the band or tape takes place to such an extent until the tape or band is retained securely by engagement with or adherence to the hose surface whereupon, by rotating the sleeve, the tape or band is wound upon the hose surface underneath the sleeve in such a manner that the tape or band is pressed during the winding operation with increasing pressure against the hose surface with simultaneous tight pressing of the hose onto the securing nipple.

Accordingly, it is an object of the present invention to provide a fastening arrangement for tightening large-diameter hoses to a connecting nipple of a coupling which is simple in construction, reliable in operation and eliminates the aforementioned disadvantages encountered with the prior art arrangements.

It is another object of the present invention to provide a tightening means for securely fastening large-diameter hoses such as fire hoses to the connecting nipple of a coupling which dispenses with the necessity of skilled workers, eliminates the danger of breakage due to non-recognizable defects in the tightening or fastening material, and obviates the need for expensive and complicated work tools to enable installation thereof.

Still a further object of the present invention resides in the provision of a fastening or securing arrangement for fire hoses which securely clamps the hoses to the hose connecting nipples of couplings without excessive spatial requirements to thereby permit accommodation thereof below the coupling nut of the couplings.

Figure 2:
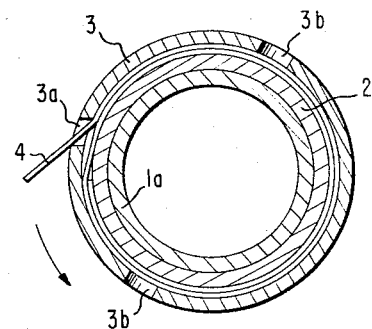
Figures 3, 3A:
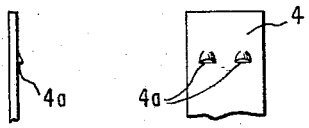
Figure 5:
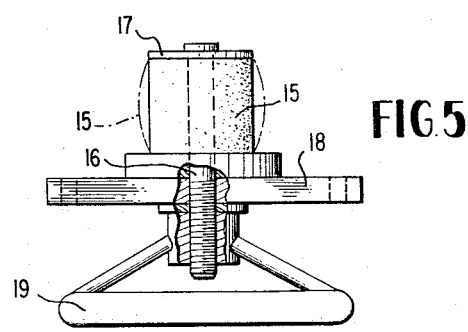
Figure 4:
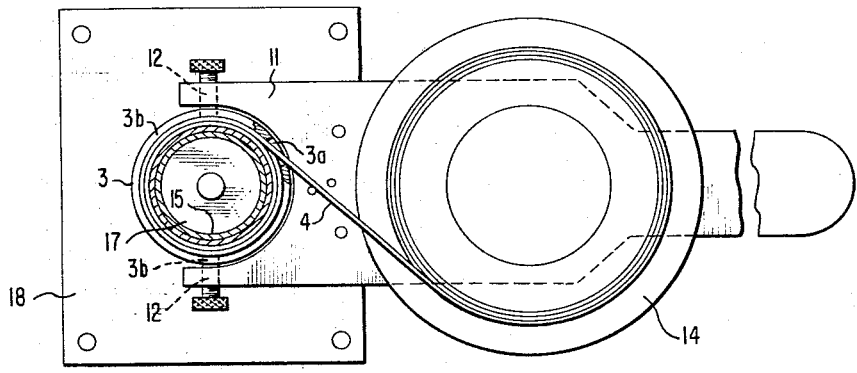
Figure 6:
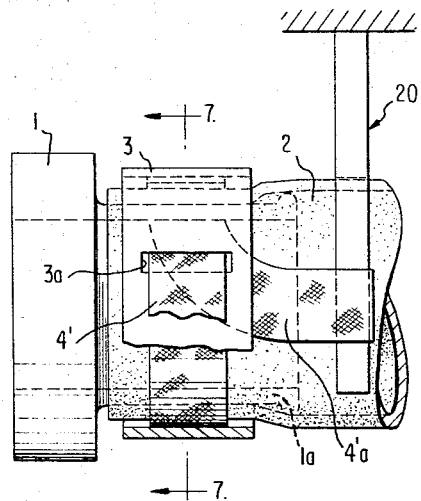
Figure 7:
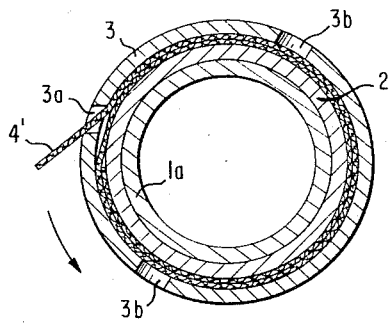

These and other objects, features and advantages of the present invention will become more obvious from the following description when taken in connection with the accompanying drawing which shows, for purposes of illustration only, one embodiment in accordance with the present invention, and wherein:

FIGURE 1 is a longitudinal view of a hose-clamping arrangement in accordance with the present invention, with parts thereof broken away, FIGURE 2 is a transverse cross sectional view of the hose-clamping arrangement of FIGURE 1 taken along line 2—2 of FIGURE 1, FIGURES 3 and 3a are a partial plan and side view, respectively, showing the beginning of the winding band or tape, FIG. 4 is a top plan view of the work tool for realizing the hose-fastening arrangement in accordance with the present invention, FIGURE 5 is an elevational view, partly in cross section, of the clamping arrangement for the connecting nipple, FIGURE 6 is a longitudinal elevational view of a hose clamping arrangement utilizing a nylon band in accordance with the present invention, with parts thereof broken away, and FIGURE 7 is a transverse cross-sectional view taken along line VII—VII of FIGURE 6.

Referring now to the drawing wherein like reference numerals are used throughout the various views to designate like parts, reference numeral 1 designates in FIGURE 1 a coupling part of a conventional hose coupling provided with a connecting nipple 1a. The hose 2 is slipped over the nipple 1a and is to be secured thereon according to the present invention as will appear more fully hereinafter.

For that purpose, a sleeve 3 is provided which is placed or slipped over the hose 2. The sleeve 3 is provided with a slot 3a through which the winding band or tape 4 is adapted to be inserted into the space between the sleeve 3 and the hose 2. This insertion of the band 4 takes place so such an extent until the band 4 is sufficiently retained by engagement with or adherence to the hose surface. The adherence of the band 4 on the hose surface is achieved by the increased bending of the band and therewith by an increasing friction of the band 4 on the hose 3. The adherence or anchoring of the band 4 on the hose 2 may be considerably improved by small pressed-out portions 4a (FIGURE 3) which form anchoring hooks or barbs. As soon as the inserted band 4 sufficiently holds on the hose surface, the sleeve 3 is rotated in the direction of the arrow (FIGURE 2). As a result of such rotation, the band 4 is increasingly drawn into the slot 3a and wound onto the hose surface. The band 4 is pressed during winding with increasing pressure against the hose surface. By reason of the thus decreasing diameter of the hose the windings slide one above the other. The friction on the band surface thereby plays a significant role. If this friction is excessive, then the necessary sliding displacements of the windings could not occur and a pressing action on the hose would not be possible. Consequently, a band with sufficiently smooth surface has to be used in order to maintain the mutual friction sufficiently small. Suitable as band or tape material is, for example, a strap made of spring steel, stainless steel or bronze. However, also bands made of other metals, even made of other material such as, for example, of fabric, plastic and/or rubber may be used. The space between the hose and the sleeve is now filled in this manner with increasing abutment pressure on the hose by a metal band stratification. The height of the layers in the stratification adapts itself accurately in each case to the existing diametric conditions. When complete filling of the space is achieved, this becomes readily noticeable by a rapidly increasing rise in the winding torque. The winding band is thereupon cut off and the still projecting short end is drawn in underneath the sleeve 3 by a further slight rotation. The abutment of the hose on the securing nipple takes place everywhere with uniform pressure. No upsetting, bulging or compressions of the hose material can occur as practically no gaps are present between hose and band. The external application to the hose surface remains small so that this type of fastening or securing means is particularly suitable for fire hoses. The engagement of the connecting nut of the hose coupling is not impaired thereby. Furthermore, it is not necessary to maintain accurately the diameter of the connecting nipple as well as of the thickness of the hose walls. Differences are simply compensated by a larger or smaller number of windings.

As work tool is used with advantage for the installation of the securing or fastening arrangement in accordance with the present invention by means of which is attained the rotation of the sleeve over the emplaced hose with the necessary force manually and in a simple manner.

FIGURES 4 and 5 show in plan view and in elevation such a work tool. The fork 11 (FIGURE 4) of the work tool thereby extends over one-half the circumference of the sleeve 3. The fork 11 is provided with entrainment pins or members 12 which engage into diametrically opposite apertures 3b provided in sleeve 3. The entrainment members 12 are thereby provided with a threaded portion and a knurled knob. A supply drum 14 for the winding band or tape 4 is provided on the fork 11 and may be detachably secured thereto in conventional manner.

A clamping arrangement (FIGURE 5) is provided for holding fast the connecting nipple during the winding operation. This clamping arrangement essentially consists of a cylindrically-shaped clamping piece 15 having a high elastic expansion, for example, of rubber, of which the diameter is somewhat smaller than the inner diameter of the connecting nipple so that the latter can be placed over the clamping piece. The clamping piece 15 is adapted to be axially pressed against the base plate 18 by means of a central draw bolt 16 and the pressure plate 17. A hand wheel 19 is provided for attracting or pulling out the bolt 16. A corresponding deflection of the lateral walls thereof in the transverse direction results from the compression of the clamping piece 15 in the axial direction as indicated by the dash and dot lines. The connecting nipple 1a placed over the clamping piece 17 is thereby securely clamped and held against any rotation.

The pressed-out portions 4a according to FIGURE 3 forming anchoring hooks are provided on the band 4 by means of a separate tool. The band 4 is inserted through the slot 3a until the latter is held by friction and the hook portions engaging the hose surface against any pull-back. By rotating the fork 11 in the clockwise direction, the sleeve 3 on the hose is taken along in such rotary movements. The band 4 is thereby drawn through the slot 3a into the space between the hose 2 and the sleeve 3 and is slowly wound upon the hose 2 until the entire space therebetween is filled. The windings mutually slide with respect to each other during rotation with a simultaneous decrease of the diameter. The tightening or fastening operation is terminated as soon as one senses that the torque increases strongly.

In the foregoing description, primarily the application of spring steel, stainless steel or bronze was initially contemplated. These materials were though most suitable because such material exhibits with high tensile strength a smooth surface and the turns during winding can slide well one above the other, to the extent as the pressing of the band on the hose takes place.

However, I have now discovered as a result of further knowledge and experiments with new materials for the winding band that a compressible winding band of synthetic fibers such as nylon is particularly well suited for the tieing of fire hoses.

Consequently, a significant improvement, which concerns the winding band, essentially consists in that the winding band is made of a compressible and foldable material with high tensile strength, for example, a plastic fiber textile material as shown in FIGURES 6 and 7.

As plastic fiber textile material is particularly suited nylon by reason of its high tensile strength. Furthermore, nylon bands have the extraordinarily desirable properties that they can be compressed which is not the case with metal bands. A circumferential reduction occurs as a result of the pressing in of the hose into the nipple groove which increases gradually during winding. With a woven material, for example, of nylon, this compressing takes place without the formation of humps, buckling or folds. With the use of metal bands there takes place an increasing mutual sliding of the individual turns, however, to permit such sliding movements the surfaces of the band have to be very smooth and also have to be possibly lubricated. Nevertheless, with an increasing number of turns limits exist. It may happen with metal bands that not sufficient layers of wound band can be wound into the space. This is completely impossible with the use of nylon bands because such bands can be compressed in a simple manner and a limitation of the number of turns therefor does not exist.

During the insertion of the band at the beginning of the winding operation, one has to prevent the slipping back of the band 4'. Instead of anchoring hooks as with metal bands, the beginning 4'a of the band 4' is simply pulled out obliquely laterally to the ring or sleeve 3 (FIG. 6) and is secured in any conventional manner at a relatively fixed member 20 schematically illustrated in FIGURE 6. For example, the inner end 4'a of the band 4' may be looped about the fixed member 20 or the latter may be provided with a suitable clamping or securing means in the form of a slot or the like. Since numerous ways of securing are available in the prior art, a detailed description thereof is dispensed with herein since the details form no part of the present invention. The securing of the band has to be immovable with respect to the clamped nipple or nipple carrier. Since the material is compressible and foldable, the beginning of the band can be pulled out laterally at the cylinder sleeve obliquely toward the outside and can be made fast. The securing of the band only has to be matched to the high tensile forces occurring during the subsequent tight winding of the band. After the completed winding operation, the band is cut off at both ends.

In addition to a woven band of nylon also a woven band of glass fibers is suitable as winding band.

It is furthermore important that the material is as little hygroscopic as possible in order that no swelling occurs in the presence of moisture or humidity and a loosening takes place with subsequent drying.

The installation described above may be used as tool for the winding operation. However, a holding fast for the band on the fork has to be provided. A brake for the unwinding of the band is additionally appropriate in order that the band is wound in tight condition.

Also a tool for establishing the tieing or winding of the hose is suitable whose supply drum is arranged concentrically to the hose nipple as ring coil. Such annular coils are well known in the electrotechnical industry for the winding of troidal coils, and therefore are not described in detail herein. The band is thereby unwound from the inside thereof, is inserted by way of a brake through the slot in the sleeve and is secured adjacent the nipple which is also held fast.

While I have shown and described one embodiment in accordance with the present invention, it is understood that the same is not limited thereto but is susceptible of numerous changes and modifications within the spirit and scope thereof and I therefore do not wish to be limited to the details shown and described therein but intend to cover all such changes and modifications as are encompassed by the scope of the appended claims.

I claim:

1. A securing arrangement for securing large diameter hoses, particularly fire hoses to the connecting nipples, comprising:

a connecting nipple, a hose telescoped over said nipple in snug engagement therewith, sleeve means placed over said hose, said sleeve means being provided with an annular passage of a greater diameter than the outer diameter of said hose and forming a space with said hose and being further provided with a slot for the insertion of a winding band into the space between said sleeve means and said hose, means on said sleeve means to rotate said sleeve means about the hose axis, and a band insertable into said slot and essentially consisting of a readily compressible and foldable material of essentially synthetic resin fibers having a high tensile strength and surface characteristics enabling mutual sliding movements between individual turns so that each layer of said band, when placed under considerable tensional and compressive stress, can be wrapped tightly around and slide relative to the adjacent layers, the inner end of the band extending laterally approximately in the axial direction outside of said sleeve means to enable the fixing of the inner end, said sleeve means being rotated until the band is subjected to considerable compressive stress as a result of substantially completely filling the space between the outer surface of said hose and the inner surface of said sleeve means thereby opposing a considerable resistance to the further rotation of said sleeve means in such a manner that the layers of the band in effect form a densely compacted supstantially solid filler-like element pressing the hose surface into tight sealing abutment against said nipple with the compression of said layers preventing rotation of said sleeve means in at least the reverse direction of rotation.

2. A securing arrangement according to claim 1, wherein said band material essentially consists of nylon.

References Cited by the Examiner

UNITED STATES PATENTS

| | | | |
|---|---|---|---|
| 188,886 | 3/1877 | Galvin | 285—37 |
| 360,663 | 4/1887 | Daniels | 29—526 |
| 1,045,277 | 11/1912 | Girling | 285—37 |
| 1,598,714 | 9/1926 | Gray | 29—526 |
| 1,882,462 | 10/1932 | Weber | 81—90.4 |
| 1,921,316 | 9/1933 | Mattern | 279—2 |
| 2,390,168 | 12/1945 | Piot | 279—2 |
| 2,394,632 | 2/1946 | Parker. | |
| 2,419,241 | 4/1947 | Wingate | 242—7 |
| 2,464,156 | 3/1949 | Sandersen | 279—2 |
| 2,513,438 | 7/1950 | Weir | 81—9.3 |
| 2,542,967 | 2/1951 | Waechter | 279—2 |
| 2,721,037 | 10/1955 | Burghardt | 242—7 |
| 2,783,173 | 2/1957 | Walker. | |
| 3,026,052 | 3/1962 | Wade | 242—7 |

FOREIGN PATENTS

| | | |
|---|---|---|
| 114,494 | 1/1942 | Australia. |
| 750,634 | 8/1933 | France. |
| 1,015,731 | 8/1952 | France. |
| 169,920 | 10/1921 | Great Britain. |

CARL W. TOMLIN, *Primary Examiner.*

R. GIANGIORGI, *Assistant Examiner.*